United States Patent
Coles

[19]

[11] Patent Number: 5,987,808
[45] Date of Patent: Nov. 23, 1999

[54] FISH STRINGER WITH FLOATING WEIGHT INDICATOR

[76] Inventor: Michael Coles, 142 N. Chester St., Kent, Ohio 44240

[21] Appl. No.: 09/109,151

[22] Filed: Jul. 2, 1998

[51] Int. Cl.[6] ................................................. A01K 97/00
[52] U.S. Cl. ................................................ 43/55; 224/103
[58] Field of Search .................... 43/54.1, 55, 1, 43/4; D22/134, 149; 224/103

[56] References Cited

U.S. PATENT DOCUMENTS

| | | | |
|---|---|---|---|
| 3,561,652 | 2/1971 | Ruter | 224/7 |
| 4,328,916 | 5/1982 | Lucas | 224/103 |
| 5,036,615 | 8/1991 | Lu | 43/17.5 |
| 5,048,219 | 9/1991 | Georgescu | 43/4 |
| 5,210,525 | 5/1993 | Lennon | 340/604 |
| 5,467,908 | 11/1995 | Cote | 224/103 |
| 5,758,449 | 6/1998 | Munsterman | 43/17 |
| 5,761,843 | 6/1998 | Lynch | 43/4.5 |
| 5,829,181 | 11/1998 | Fielder | 43/17 |

*Primary Examiner*—Jack W. Lavinder
*Attorney, Agent, or Firm*—Renner, Kenner, Greive, Bobak, Taylor & Weber

[57] ABSTRACT

A fish stringer for use in tournament fishing is provided having a weight indicator attached thereto which can be manually adjusted to indicate the weight of the fish attached to the stringer. A clip attached through the fish's gill and thereby fastens the fish to a suitable cord which attaches to a floating weight indicating device. The weight indicating device contains a number of disks bearing numbers which may be manually rotated to create a display of the weight of the fish. This device floats on the surface of the water and thereby allows a fisherman to efficiently locate the lightest fish held in his live well.

13 Claims, 1 Drawing Sheet

FISH STRINGER WITH FLOATING WEIGHT INDICATOR

TECHNICAL FIELD

The present invention relates generally to a fish stringer. More particularly, the invention relates to a fish stringer for sportsmen tournament fishing providing a floating weight indicator to assist a fisherman in efficiently locating the lightest fish in the live well in order to replace it with a heavier fish.

BACKGROUND ART

The winner and placement of contestants in a fishing tournament is commonly determined on the basis of fish weight. The fishermen competing in the tournament may catch and "turn in" up to a specified number of fish, with the total weight of these fish determining the placement of the tournament contestants. In order to protect the fish population and retain the sporting aspect of the tournament, all fish caught are kept alive and released at the end of the tournament, or at the end of each day when the tournament lasts for multiple days. Furthermore, the maximum number of fish allowed to determine the total weight also dictates the maximum number of fish that a tournament fisherman may retain in the live well at any one time. Once the maximum number of fish has been placed in the live well, the fisherman must decide whether to release a fish caught thereafter or to release a fish in the live well and replace it with the new fish. Inasmuch as weight is the key factor, a fisherman will replace the lightest fish in his live well with a heavier fish subsequently caught once the maximum number of fish have been placed in the live well.

Efficiency is very important to tournament fishermen who must catch large numbers of fish, releasing them or rotating them with the fish in the live well to constantly increase the total weight of fish therein. For this reason, fishermen desire to spend the majority of their time casting out line and reeling in fish rather than determining which fish should be retained and which released. The common method for making this determination does little to facilitate the fisherman's need for speed and efficiency.

A fisherman may simply retain every fish of adequate size until the maximum number of fish are placed in the live well. Thereafter, the fishermen must weigh each new fish caught and, if it is of greater weight than the lightest fish in the live well, he must locate the lightest fish and release it in order to abide by the tournament rules. Determining the lightest fish in the live well may take a considerable amount of time and detract from the fisherman's ability to catch larger numbers of fish. First, the fisherman will "eyeball" and select a small fish from the live well and reweigh this fish in order to compare it to the fish he has just caught. This eyeballing method is inaccurate at best and may require the fisherman to weigh a large number of fish in order to locate the one with the smallest weight. With every larger fish caught, this method must be employed in order to ensure that the fisherman has retained the heaviest fish caught. All the time spent in making weight determination lessens the available time the fisherman can spend attempting to land larger fish.

Thus, there is a need in the art for a device which will assist a tournament fisherman in quickly assessing which fish in the live well should be released once a larger fish has been caught.

DISCLOSURE OF INVENTION

It is therefore an object of the present invention to provide a fish stringer having a weight indicator attached thereto.

A further object of the present invention is to provide a fish stringer having a weight indicator which can be quickly adjusted to indicate different weights when the fish stringer is switched from a lighter to a heavier fish.

It is another object of the present invention to provide a fish stringer having a weight indicator which floats on the surface of the water in the live well.

It is yet another object of the present invention to provide a fish stringer having an adjustable color indicator whereby the lightest fish may be quickly identified by setting the color indicator to a specific color.

The foregoing and other aspects of the invention which will become apparent as the detailed description proceeds are achieved by a fish stringer, comprising: a cord; a clip means which is attached to one end of said cord; and a floating weight indicator attached to the opposite end of said cord.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
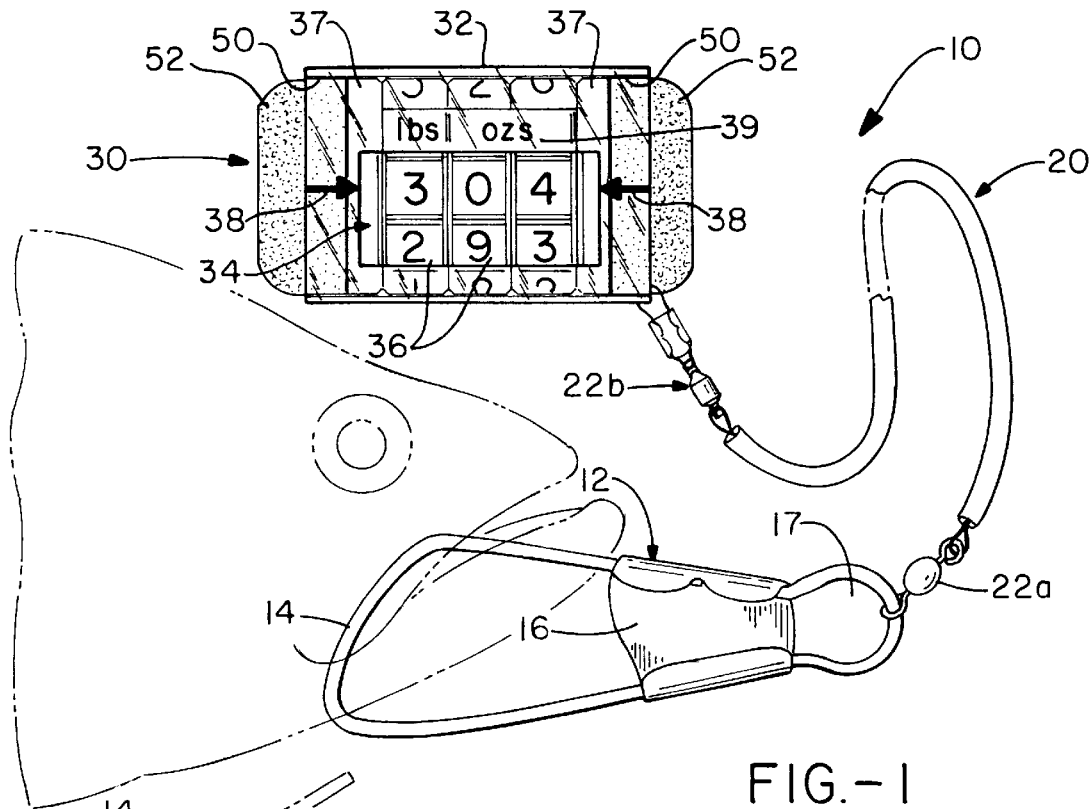
FIG. 1 illustrates a fish stringer according to the present invention.

Referring now to the drawings and more particularly to FIG. 1, it can be seen that the fish stringer of the present invention is designated generally by the numeral 10. The fish stringer 10 has a fastening clip 12 which is attached by cord 20 to weight indicator 30. As will become more apparent in the description which follows, the fastening clip 12 attaches a single fish to the weight indicator 30 which is capable of displaying the weight of the fish attached thereto.

Figure 2:
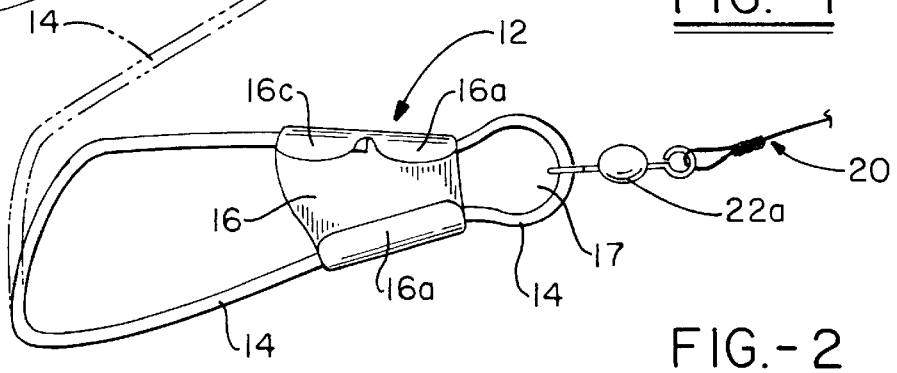
FIG. 2 is a front view of the fastening clip element of the present invention.

Referring now to FIG. 2, it can be seen that the fastening clip 12 is constructed of a spring wire 14 which extends from retention plate 16 where it is secured by flange 16a and creates an eyelet 17 by looping back to where it is secured by flange 16b from which it extends and is bent back to releasably engage flange 16c. By releasably engaged, it is meant that the spring wire 14 can be disengaged from flange 16c by compressing the loop created between flanges 16b and 16c. When disengaged, the spring wire 14 will shift to a biased position, such as that shown in the dashed lines in FIG. 2, thereby opening the fastening clip 12. When in this open position, the spring wire 14 can be inserted through a fish gill and out the mouth where it can then be reengaged with flange 16c so that the fish is safely connected to the cord 20 and weight indicator 30. Regarding the fastening clip 12, the important concern is that the fish is safely and securely attached to the remainder of the fish stringer 10. Therefore, it should be appreciated that, while the preferred embodiment of the present invention is achieved with the fastening clip 12 disclosed hereinabove, other methods for securing a fish to the cord 20 and weight indicator 30 may be employed and fall within the scope of the present invention.

Referring back to FIG. 1, it can be seen that cord 20 connects the fastening clip 12 to the weight indicator 30. As shown, in a preferred embodiment of the fish stringer 10, cord 20 is a leader received within a tubing. The tubing is provided to prevent the leader from becoming entangled with itself or other leaders as it may normally have a tendency to do during storage or during use as fish attached to their individual fish stringer 10 swim around a live well causing contact between various leaders. Of course, although the combination of a leader and tubing is preferred, cord 20 can be of single piece construction and can be made from any suitable material, be it rope, fishing line, or any other material known in the art. Preferably, the cord 20 should be strong enough to support the weight of the fish towards which use of the present invention is directed. Also, cord 20 should be light weight so as not to effect the buoyancy of the weight indicator 30. The fastening clip 12 is connected to the cord 20 by swivel 22a which attaches to the fastening clip 12 through the eyelet 17. Although the swivel is disclosed so as to set forth the best mode for practicing the invention, other methods of connection may be employed and fall within the scope of the present invention.

For a better understanding of the construction and operation of the weight indictor 30, reference should be made to FIG. 1. Weight indicator 30 is attached to cord 20 and thereby to clip 12 and any fish attached thereto, by swivel 22b. Although the swivel is disclosed so as to set forth the best mode for practicing the invention, other methods of connection may be employed and fall within the scope of the present invention.

The main shape of weight indicator 30 is defined by the housing 32 and is preferably cylindrical. The housing 32 is preferably made of a low density plastic, although any material which does not unduly frustrate the buoyancy of the floater may be used. Indeed, the present invention embraces the concept that the housing may be constructed out of material that will float on water. Housing 32 contains a housing window 34 which is rectangular in shape and allows for access to the rotating disks 36 contained within the housing 32. The rotating disks 36 fit within the contours of the internal surface area of the housing 32 and are held in intimate contact with each other by internal housing plates 37. The internal housing plates 37 are fixedly attached to the internal surface of the housing 32 at points directly adjacent the housing window 34 so that a portion of the circumferential surface area of every rotating disk 36 is fully displayed and accessible in the housing window 34.

The rotating disks 36 are retained by the housing 32 in such a manner that they may be selectively rotated in an indexing fashion to display the weight of the associated fish. The disks 36 then hold that position until subsequently indexed by finger force of the user. A simple pawl and tooth arrangement may be employed or, more preferably, the outside diameter of the disks 36 and the inside diameter of the housing 32 may be so configured as to provide a friction or interference fit therebetween. In either event, each individual rotating disk 36 may be rotated by manipulation of the disk where it is exposed in the housing window 34. The circumferential surface area of each rotating disk 36 is marked off into ten sections of equal area which are numbered sequentially with the integers zero through nine. Therefore, manipulation of rotating disks 36 allows for the display of all integers from zero to nine hundred ninety-nine. When displaying a specific number, the rotating disks 36 are rotated so that the desired number falls along the line indicated by the arrows 38 on the housing 32.

One method of employing the present invention is to have the number displayed between arrows 38 indicate the total weight, in ounces, of the fish attached to the fish stringer 10. In the alternative, the leftmost rotating disk 36 may indicate the fish weight in pounds while the other two rotation disks 36 indicate the remainder, in ounces. Indeed, the numbers may be used in any way to indicate weight and the scope of the present invention is not limited to those methods particularly described above. In the preferred embodiment of the present invention, unit designators 39 are placed above corresponding rotating disks 36 so as to designate what units the displayed integer represents. In the preferred embodiment, the leftmost rotating disk 36 corresponds to pounds (lb.), while the remaining two rotating disks 36 correspond to ounces (oz.) As stated above, different weight indicating methods may be utilized and therefore, different unit designators 39 may be employed and fall within the scope of the present invention.

Figure 3:
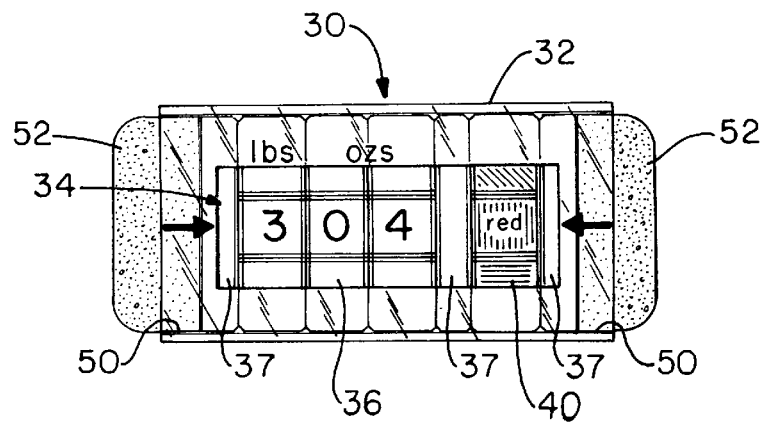
FIG. 3 displays a second embodiment of the weight indicator element of the present invention.

In the second embodiment of the present invention, an additional disk may be employed. Referring now to FIG. 3, it can be seen that a rotating color disk 40 is provided along with rotating disks 36. The rotating color disk 40 increases the ease with which a fisherman can compare fish in the live well with fish subsequently caught. The fisherman simply designates a color as indicating the lightest fish in the live well and, when a subsequent fish is caught, compares its weight to the weight of the fish whose floater bears that color. For example, a fisherman may decide the color red will be used to designate his lightest fish and, when another fish is caught, he will weigh that fish against the weight of the fish whose rotating color disk 40 displays red. Then, if the new fish is larger, he may rotate it into the live well in place of the smallest fish and then either remember the color indicated on the lightest fish now remaining or dial that lightest remaining fishes' rotating color disk 40 to red. Following such a procedure, the fisherman can always quickly locate the lightest fish in the live well. Indeed, the wise fisherman may employ a sequence of colors to grade the fish from lightest to heaviest and then simply change the associated colors when a new fish is added. Of course, it will also be understood that indicia other than color, such as number, may be used for such ordering of the fish.

In the preferred embodiment of the present invention, rotating color disk 40 is separated from rotating disk 36 and secured in place by an additional internal housing plate 37; however, this positioning is merely preferred and rotating color disk 40 may be contained in intimate contact with rotating disks 36 or may be positioned elsewhere within housing 32 without deviating from the scope of the present invention.

Referring now to FIGS. 1 and 3, it can be seen that the rotating disks 36 and, if employed, the rotating color disk 40 are held in place and restrained in horizontal movement by internal housing plates 37. The internal housing plates 37 serve not only to hold the rotating disks 36 and the rotating color disk 40 in place, but also create recesses 50, within housing 32, which accomodate floating material 52. Floating material 52 may be chosen from any material that will impart the desired floating ability to the weight indicator 30. In the preferred embodiment of the present invention, the floating material 52 is a closed cell foam material which is fixedly adhered to the inside of the recesses 50. However, the scope of the present invention is not limited thereto and any material that imparts the desired buoyancy may be employed.

In a third embodiment of the present invention, floating material 52 is also used to increase the ease with which a fisherman can compare fish in the live well with fish subsequently caught. In this embodiment, floating material 52 is colored-coded and is releasably received in recesses 50 so that floating materials of different colors may be inserted and removed from recesses 50. The colored floating material 52 may then be used to locate the lightest fish in the live well in a manner substantially similar to that used when employing the rotating color disk 40, discussed hereinabove.

It should also be appreciated, as mentioned herein above, that housing 32 may be constructed out of buoyant material, thereby eliminating the need for recesses 50 and floating material 52. Thus, in a fourth embodiment of the present invention, recesses 50 and floating material 52 are not employed because the housing 32 is buoyant.

Thus, when fastening clip 12 is fixedly attached through the gill of a fish, the fish is thereby attached, through cord 20, to a weight indicator 30 which is kept afloat on top of the live well by floating material 52. This provides the tournament fisherman with a quick and easy means for determining which fish to release and which fish to rotate into the live well in order to retain the maximum fish weight at all times.

Thus it can be seen that the objects of the invention have been satisfied by the structure presented above. While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. A fish stringer, comprising:

a cord;

a fastening clip which is attached to one end of said cord; and a floating weight indicator attached to the opposite end of said cord, said floating weight indicator adapted to be being manipulated to indicate thereon various magnitudes of weight.

2. A fish stringer as described in claim 1, wherein said floating weight indicator comprises:

a housing;

a housing window;

rotating disks having integers displayed on their circumferential surface area, said rotating disks retained within said housing and displaying said integers through said housing window; and floatation material attached to said housing.

3. A fish stringer as described in claim 2, further comprising a rotating color disk having colors displayed along its circumferential surface area, said rotating color disk being retained within said housing and displaying said colors through said housing window.

4. A fish stringer as described in claim 2, further comprising a rotating color disk retained within said housing and having colors displayed along its circumferential surface area, wherein said rotating disks display said integers through one housing window and said rotating color disk displays said colors.

5. A fish stringer as described in claim 2, wherein said flotation material is a closed cell foam material.

6. A fish stringer as described in claim 2, wherein said floating weight indicator further comprises internal housing plates fixedly attached to the internal surface area of said housing at the borders of said housing window and holding said rotating disks in innermost contact with one another.

7. A fish stringer as described in claim 6, wherein said housing plates create recesses within said housing and said floatation material is adhesively attached to the surface area within said recesses.

8. A fish stringer as described in claim 6, wherein said housing plates create recesses within said housing and said floatation material is releasably received within said recesses.

9. A fish stringer as described in claim 8, wherein said floatation material is colored-coded to indicate a relative weight of a fish attached to the fish stringer.

10. A fish stringer as described in claim 6, further comprising:

a rotating color disk having colors displayed along its circumferential surface area;

a second housing window; and an additional internal housing plate, wherein said internal housing plates hold said rotating disks so that their integers are displayed through one housing window and said additional internal housing plate holds said rotating color disk so that its colors are displayed through said second housing window.

11. A fish stringer as described in claim 1, wherein said floating weight indicator comprises:

a housing;

a housing window; and rotating disks having integers displayed on their circumferential surface area, said rotating disks being retained within said housing and displaying said integers through said housing window, wherein said housing is formed of a flotation material.

12. A fish stringer as described in claim 1, wherein said floating weight indicator comprises:

a housing;

a housing window; and rotating disks having integers displayed on their circumferential surface area, said rotating disks being set within said housing and displaying said integers through said housing window; and internal housing plates fixedly attached to the internal surface area of said housing at the borders of said housing window so that said rotating disks are held in intimate contact with one another, said housing, internal housing plates, and said rotating disks being made from materials selected so that the overall specific gravity of said floating weight indicator is less than 1.

13. A fish stringer as described in claim 1, wherein said floating weight indicator comprises:

a housing;

a housing window; and rotating disks having integers displayed on their circumferential surface area, said rotating disks retained within said housing and displaying said integers through said housing window, said floating weight indicator being made from materials selected so that the overall specific gravity of said floating weight indicator is less than 1.

* * * * *